United States Patent [19]
Martens

[11] 3,858,280
[45] Jan. 7, 1975

[54] FASTENING CLIP

[75] Inventor: Martin A. J. Martens, Peabody, Mass.

[73] Assignee: I. D. Engineering, Inc., Peabody, Mass.

[22] Filed: Nov. 17, 1972

[21] Appl. No.: 307,366

[52] U.S. Cl............. 24/150 R, 24/155 BR, 24/108, 24/110, 24/211 L
[51] Int. Cl........................... A44b 9/00, A44b 1/38
[58] Field of Search........ 24/211 L, 90 E, 108, 110, 24/158 R, 136 A, 155 BR, 150 R; 287/DIG. 5; 85/5 B; 279/22, 30, 75

[56] References Cited
UNITED STATES PATENTS

| | | | |
|---|---|---|---|
| 1,130,716 | 3/1915 | Dressel | 279/75 |
| 1,454,857 | 5/1923 | Phinney | 24/110 |
| 1,457,550 | 6/1923 | Runkel | 279/30 |
| 1,714,684 | 5/1929 | Malcolm | 279/30 |
| 2,815,971 | 12/1957 | Guinane | 85/5 B |
| 2,838,266 | 6/1958 | Rees | 279/22 |
| 3,033,016 | 5/1962 | Moberg | 85/5 B |

Primary Examiner—Bernard A. Gelak
Attorney, Agent, or Firm—Donald D. Jeffery

[57] ABSTRACT

A fastening clip for securing articles together, the clip including releasably connected male and female components. The male component comprises a pin and the female component comprises a retainer for releasably clamping the pin. When joined, the pin cannot be separated from the retainer except by a specially formed tool which is insertable in the retainer. Manipulation of the tool serves to condition the retainer for removal of the pin. In a modified form of the invention, the retainer is of magnetic material, and an actuating tool including an electromagnet is employed to actuate the retainer and permit removal of the pin.

4 Claims, 6 Drawing Figures

Patented Jan. 7, 1975
3,858,280
2 Sheets-Sheet 1
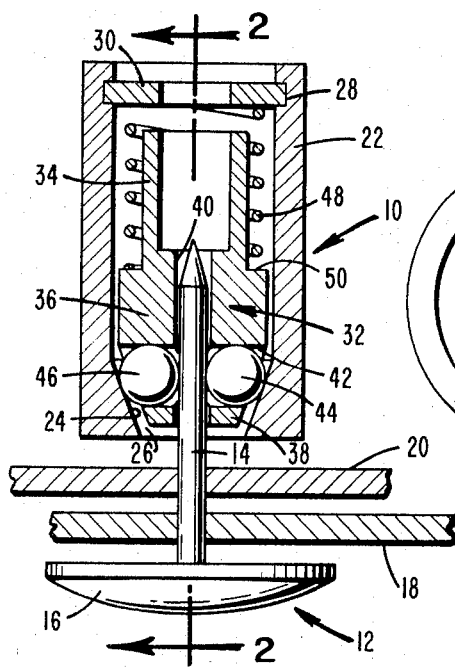
FIG. 1
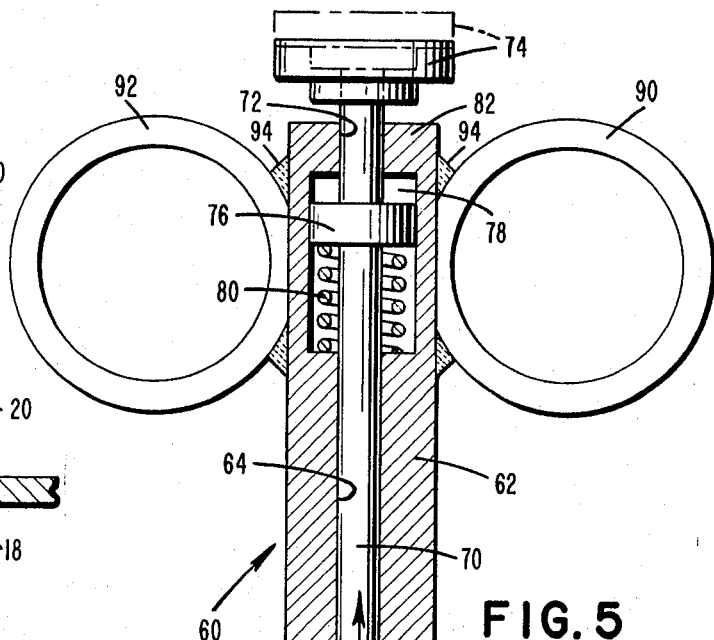
FIG. 5
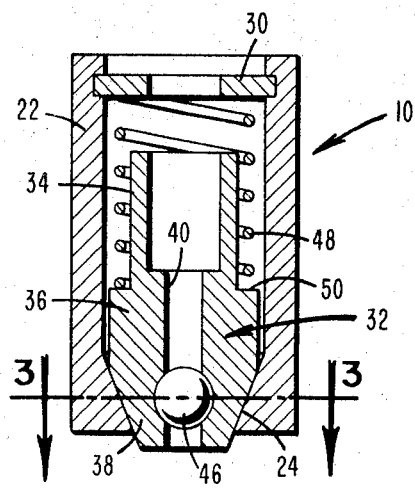
FIG. 2
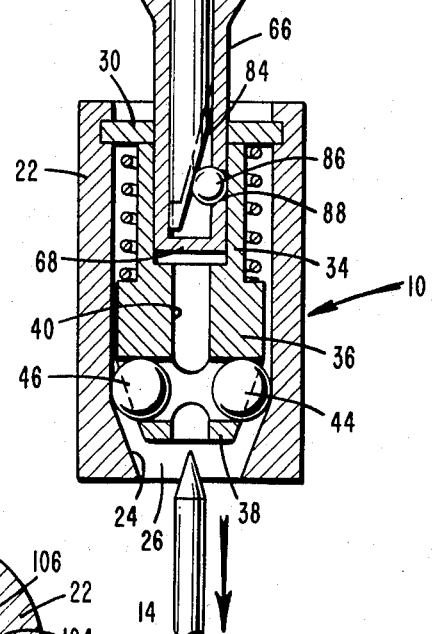
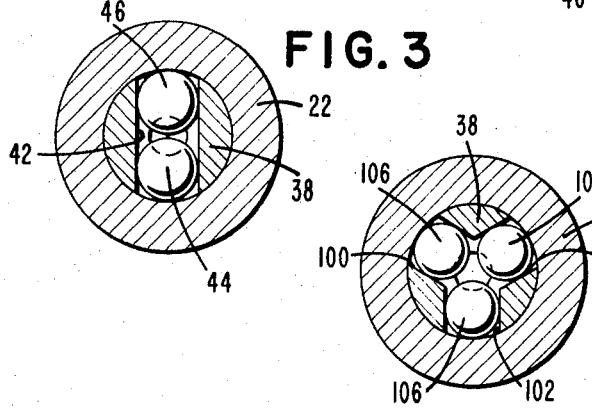
FIG. 3
FIG. 4

FASTENING CLIP

The present invention relates as indicated to a fastening clip and a tool for releasing the same, and relates more particularly to a fastening clip which can be used to attach two or more articles together in such a manner that they can be separated only by the use of a special tool. Although it will be understood and will become apparent as the following description proceeds that the invention can be used in essentially any environment where it is desired to secure temporarily two or more members together, it is particularly useful where it is intended to temporarily secure identification tags to articles prior to the authorized handling of such articles, at which time the identification tag can be removed. A specific use is for purposes of anti-theft detection in department stores and the like where the identification tag must be removed from the article purchased during the check-out process. If a person attempts to surreptitiously remove the article from the store without purchasing the same, the identification tag can be designed to actuate an alarm system.

BACKGROUND OF THE INVENTION

Separable fastener clips of the general type concerned have long been known in the art, including devices in which a special key or tool must be used to separate the fastener sections. However, prior devices have not been entirely satisfactory for several reasons, with perhaps the most obvious drawback being the inability in prior devices to prevent unauthorized separation of the fastener sections.

SUMMARY OF THE INVENTION

A primary object of the present invention is to provide a fastening clip which can be quickly and easily secured to the articles to be temporarily fastened, while at the same time providing a locking arrangement which positively prevents separation of the fastener components without a special tool. In accordance with the invention, any attempted removal or separation of the fastener components serves to increase the resistance to such separation. The female section of the fastener is constructed so as to prevent separation of the fastener components except by a specially designed tool.

A further object of the present invention is to provide a tool specially formed to uniquely cooperate with the female fastener section to quickly and easily condition the same for removal of the mail fastener component, which in the form shown in accordance with the present invention comprises a pin.

A still further object of the present invention is to provide a fastener clip and removing tool which are relatively simple in construction, and which can be repeatedly reused.

BRIEF DESCRIPTION OF THE APPLICATION DRAWINGS

In the application drawings,

FIG. 1 comprises a longitudinal cross sectional view through the fastener assembly comprising the present invention;

FIG. 2 is a longitudinal sectional view taken at 90° relative to the sectional view comprising FIG. 1, with this figure showing only the female section of the fastener clip;

FIG. 3 comprises a transverse sectional view taken on line 3—3 of FIG. 2;

FIG. 4 is a transverse sectional view similar to FIG. 3, showing a modified form of the invention;

FIG. 5 is a longitudinal cross sectional view of the fastener clip assembly and the tool for separating the same, with the fastener pin being shown removed from the fastener housing; and, FIG. 6 is a partially schematic view of an alternative form of special tool for electromagnetically actuating the assembly to permit removal of the fastener pin.

DETAIL DESCRIPTION OF THE PREFERRED EMBODIMENTS

Figure 6:
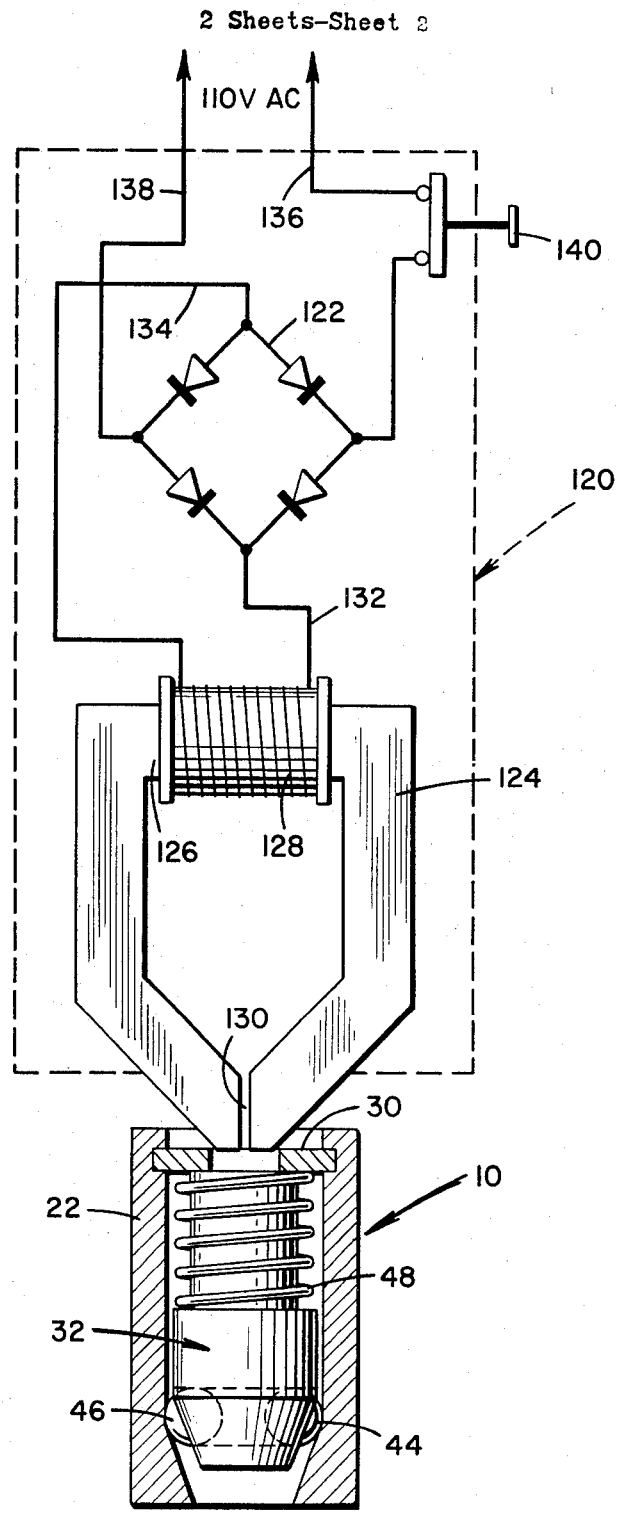

Referring now in more detail to the application drawings, wherein like parts are indicated by like reference numerals, and initially to the form of the invention illustrated in FIGS. 1-3 and 5, the fastening clip comprises a female section generally indicated at 10 and a male part generally indicated at 12, with the latter being in the form of a pin having a pointed shank 14 and an enlarged head portion 16. The shank of the pin can be inserted through the articles to be temporarily secured and inserted and retained in the female section 10. Although it will be understood that the secured articles can be of essentially any form, a typical installation may include an article 18 to be purchased and an identification tag 20 associated with said article to insure that the article 18 is not removed from the premises without authorized purchase. The tag 20 forms no part of the present invention, and may comprise a tag of the type disclosed and claimed in copending application Ser. No. 114,306, filed Feb. 10, 1971, in the name of Henry J. Martens, and entitled "Method of and Apparatus for the Detection of Stolen Articles."

The section 10 of the fastening clip includes a generally cylindrical housing 22 formed at one end thereof with a downwardly tapered wall 24 which forms a conical opening 26 at such end of the housing. An annular groove 28 is formed in the housing adjacent the opposite end thereof, with the groove receiving a retaining ring 30 which can be welded, soldered, pressed, or otherwise secured in the groove 28 so as to be permanently joined to the housing.

A retainer generally indicated at 32 is loosely received within the housing, with the retainer including a generally cylindrical upper section 34 of relatively reduced diameter, a central portion 36, and a conically tapered lower end portion 38, the tapered angle of which matches the taper of the conical wall 24 of the housing 22. The central and tapered sections 36 and 38 of the retainer are axially bored as shown at 40 for loosely receiving the shank 14 of the pin 12.

In the form of the invention shown in FIGS. 1-3, a transverse bore 42 is formed in the tapered section 38 of the retainer for receiving retaining balls 44 and 46, which are loosely received in the bore 42 and which are greater in diameter than the axial bore 40. It will be noted that when the retainer 32 is seated on the tapered wall 24 of the housing 10, as shown in FIGS. 2 and 3, the retaining balls 44 and 46 overlap the axial bore 40.

A spring 48 is telescoped around the upper section 34 of the retainer, with one end of said spring contacting the underside of the retainer ring 30, and the opposite end of said spring engaging a shoulder 50 which forms the upper surface of the central section 36 of the retainer. The spring 48 biases the retainer 32 downwardly, in the orientation of the retainer as shown in FIGS. 1 and 2, thereby wedging the conical portion 38 of the retainer into engagement with the tapered wall 24 of the housing. In such position, in the absence of pin 12, the retaining balls 44 and 46 extend into the axial bore 40, as above noted.

When it is desired to temporarily secure the articles 18 and 20 to the fastening clip, the shank 14 of the pin 12 is inserted into the exposed end of the axial bore 40, with the pointed end of the shank 14 of the pin during such initial movement contacting the retaining balls 44 and 46. Since the balls cannot move transversely in the wedged condition of the retainer 32, the pin upon further penetration will serve to raise the retainer 32 against the bias of the spring 48, with the resulting movement of the retainer relative to the housing providing additional room for lateral movement of the retaining balls away from the bore 40 thereby permitting passage of the shank 14 of the pin 12 past the balls and into the position shown in FIG. 1. When the pin is released subsequent to the insertion process, the spring 48 will bias the retainer 32 downwardly whereby the retaining balls 44 and 46 tightly, frictionally engage the exterior surface of the shank 14 and the contiguous surfaces of the tapered wall 24 of the housing. The pin 12 is thus retained in the fastener section 10.

An important aspect of the present invention resides in the inability to separate the pin 12 from the fastener section 10 without a special tool. It will be noted that if the pin 12 is attempted to be withdrawn from the section 10, the frictional force applied by the balls 44 and 46 is increased due to the indicated wedging action. It will further be noted that the internal diameters of the upper section 34 of the retainer and of the retaining ring 30 are substantially the same whereby it is not possible to insert an ordinary tool, such as a screwdriver or the like, into the section 10 and affect longitudinal movement of the retainer 32. The assembly is thus essentially foolproof to tampering once the pin has been inserted in the fastener section 10.

Referring now to FIG. 5, a removal tool is generally indicated at 60, comprising a main body section 62 having an axial bore 64 formed therein. The lower end 66 of the tool is of reduced diameter, and terminates in a closed end 68, with the external diameter of the lower section 66 being slightly less than the inside diameter of the upper section 34 of the retainer 32.

Disposed within the axial bore 64 is an actuating rod 70 which extends exteriorly of the body 62 through an opening 72 at the top end of the body, with a push button 74 being secured to the exposed end of the rod. A piston-like disc 76 is secured around the rod 70 and moves longitudinally in chamber 78 within the body 62 adjacent the upper end thereof. A spring 80 engages the underside of the disc 76 thereby biasing the same upwardly relative to the body 62 until the top surface of the disc 76 contacts the adjacent face of the end 82 of the body. In such position, the push button 74 is shown in FIG. 5 in dash lines.

The lower end of the rod 70 is tapered as indicated at 84, with such tapered end assuming the dash line position when the push button is elevated. A ball 86 is disposed within the lower section 66 of the body adjacent the tapered end and extending partially through an opening 88 formed in the side wall of the section 66. Even when the rod 70 is elevated the ball 88 is prevented from dropping downwardly into the closed end of the section 66 by virtue of the dimensional relation between the tapered section and the apertured side wall of the section 66. When the tapered section 84 is so elevated, the ball 86 does not extend completely through the opening 88 thereby not to frictionally engage the adjacent surface of the retainer 32.

Finger loops 90 and 92 are secured to the body 62 by any suitable means, for example by welding as shown at 94, to aid in manipulating the tool for separating the fastener components. In normal use of the tool, the index and middle fingers are positioned through the loops 90 and 92 thereby permitting the thumb to engage and depress the button 74.

To remove the pin 12 from the fastener clip section 10, the lower section 66 of the tool 60 is inserted within the upper section 34 of the retainer 32, as shown in FIG. 5. The push button 74 is then depressed against the bias of spring 80 to lower the rod and consequently the tapered surface 84 thereof relative to the tool body. The ball 86 is thereby cammed outwardly until the same penetrates slightly beyond the opening 88 and into tight frictional engagement with the adjacent surface of the retainer section 34. The ball 86 thereby serves effectively to frictionally couple the tool 60 to the retainer 32. The tool 60 is thereafter raised, with the rod 70 still depressed, carrying with it the retainer 32, which moves relative to the housing 10. Movement of the retainer 32 is terminated when the top surface of the upper section 34 of the retainer engages the underside of the retaining ring 30.

When the retainer 32 has been so raised relative to the housing 10, room is provided for the balls 44 and 46 to move upwardly and outwardly along the tapered wall 24 to a position where they do not frictionally clamp the pin shank 14, such position being shown in FIG. 5. With the release of the ball pressure on the shank 14 of the pin 12, the latter can be withdrawn from the retainer, as shown by the arrow of FIG. 5.

FIG. 4 shows a modified form of the invention in which three circumferentially spaced transverse openings 100, 102 and 104 are formed in the tapered bottom section 38 of the retainer in lieu of the transverse bore 42 shown in FIGS. 1–3. In such arrangement, three retaining balls, commonly designated at 106, are provided which serve to provide increased frictional force on the pin 12 when the same has been inserted into the clip fastener section 10.

Referring to FIG. 6, there is illustrated therein an alternative form of tool for releasing the pin from the fastener assembly. In this form, the retainer 32 is constructed entirely of magnetic material such as steel or of a suitable material such as plastic impregnated with magnetic material, and is moved longitudinally in the fastener housing 22 to permit pin withdrawal by generating a magnetic field adjacent the housing for attracting the magnetizable retainer. By moving the retainer away from the end of the housing wherein the pin is retained, the pin can be withdrawn in the manner described above in connection with the FIGS. 1–5 forms of the invention.

In FIG. 6 the fastener clip section 10 is identical to the form thereof shown in FIGS. 1, 2 and 5, and like reference numerals have accordingly been employed.

In addition, as above indicated, the retainer 32 is of magnetic material. The alternative tool form is shown disposed adjacent the section 10, encased in a housing 120 shown schematically in dashed lines. The housing 120 can be of any suitable size and shape, with the details thereof not being essential to a full understanding of the structure or function of this form of the invention.

Mounted within the housing 120 and shown diagrammatically in FIG. 6 is a full wave rectifier bridge 122 and an electromagnet 124 around one leg 126 of which is wound copper windings 128. The electromagnet 125 can be of any suitable construction, for example, a thoroid with an air gap 130 of approximately one-eighth inch provided opposite the leg 126. The bridge 122 is electrically connected to the opposite ends of the windings 128 by conductors 132 and 134. The bridge 122 is connected to a 110 volt, alternating current source by conductor lines 136 and 138.

Disposed in line 136 is a pushbutton switch 140 which is shown in FIG. 6 in a closed position thereby supplying current to the rectifier bridge 122 which in turn supplies direct current through line 132 to windings 128 thereby creating a strong magnetic field across the air gap 130. When the gap 130 is disposed adjacent the section 10, as shown in FIG. 6, the magnetized retainer 32 is drawn toward the electromagnet thereby releasing the balls 46 and permitting withdrawal of the pin. When the switch 140 is opened, the electromagnet is deenergized and the magnetic field dissipated.

It will thus be seen that in accordance with the FIG. 6 form of the invention, the retainer can be quickly and easily actuated by the special tool and the pin released. Unless and until actuated, the retainer prevents surreptitious, unauthorized removal of the pin in the manner above described.

It will thus be seen that the present invention provides a relatively simple yet highly effective fastening clip for releasably securing articles together. Once connection has been made, attempted separation of the pin from the retainer only serves to increase the frictional resistance to pin withdrawal, thereby making the fastening clip essentially tamper proof. However, when the tool 60 or 120 is properly positioned as above described, the retainer 32 can be quickly and easily moved longitudinally relative to the housing thereby to release the clamping pressure on the pin to permit separation thereof from the retainer. I claim:

1. A fastening clip for securing two or more articles together comprising:

a. a generally cylindrical housing the inner wall at one end of which is tapered to form a conical bore at such one end thereof,
   b. a retainer loosely received entirely within said housing, said retainer including an upper portion of reduced outer diameter, a central cylindrical section having a diameter slightly less than the inside diameter of said housing so as to guide said retainer during movement thereof, and a lower section formed with a conical exterior surface adapted to mate with said tapered wall of said housing, an axial bore extending entirely through said retainer, and at least one transverse opening formed in said lower section of said retainer, said opening being of relatively greater dimension than said axial opening,
   c. a plurality of retaining balls positioned in said transverse opening and adapted to engage said tapered wall and intersect said axial bore,
   d. spring means disposed around said upper portion of said retainer for resiliently biasing said retainer toward said tapered wall of said housing thereby biasing said balls toward said axial bore, and
   e. pin means extending upwardly into said axial bore and tightly frictionally engaged by said retaining balls, any attempted withdrawal of said pin from said retainer serving to increase the frictional force on said pin exerted by said balls.

2. The fastening clip of claim 1 further including a retaining ring mounted in said housing adjacent the upper end thereof, the inner diameter of said ring being not greater than the inner diameter of said upper portion of said retainer to prevent effective access to the adjacent end of said retainer for manipulating the same relative to said housing, said resilient biasing means being disposed around said upper portion of said retainer and urging the latter downwardly in the housing.

3. The fastening clip of claim 1 wherein said retainer is constructed of magnetized material for actuation by a magnet positioned adjacent the upper end of the clip.

4. The fastening clip of claim 1 wherein said transverse opening formed in said lower section of said retainer extends transversely entirely through said retainer, with a pair of balls being disposed in such transverse opening.

* * * * *